INVENTOR.
MANUEL TAMA
MARIO TAMA

Feb. 18, 1947.   M. TAMA ET AL   2,415,974
SUBMERGED RESISTOR TYPE INDUCTION FURNACE AND METHOD OF OPERATING
Filed April 21, 1945   3 Sheets-Sheet 2
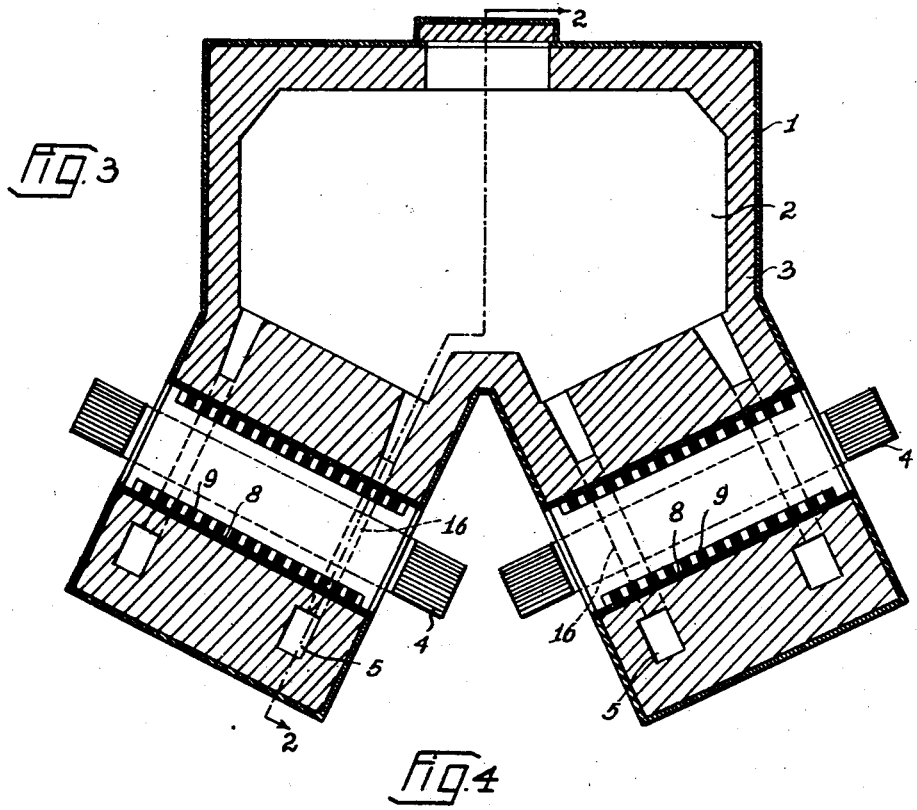
| CODE | NUMBER OF TURNS | PRIMARY CURRENT AMPS. | SECONDARY CURRENT AMPS | CROSS SECTION cm² | CURRENT DENSITY AMPS/cm² | d²d / x10⁻⁶ |
|---|---|---|---|---|---|---|
| A | 95 | 150 | 14200 | 14.1 | 1000 | 4.25 |
| B | 55 | 530 | 29200 | 48 | 610 | 2.9 |
| C | 33 | 1000 | 33000 | 80 | 414 | 1.7 |
| D | 150 | 50 | 7500 | 12.9 | 580 | 1.36 |
| E | 150 | 50 | 7500 | 12.9 / 22 | 580 / 325 | 1.36 / 0.57 |
| F | 144 | 120 | 17500 | 19.7 / 75 | 890 / 234 | 4 / 0.53 |
| G | 42 | 240 | 31000 | 4.5 / 142 | 690 / 218 | 3.6 / 0.64 |
INVENTOR.
MANUEL TAMA
MARIO TAMA
BY
Atty.

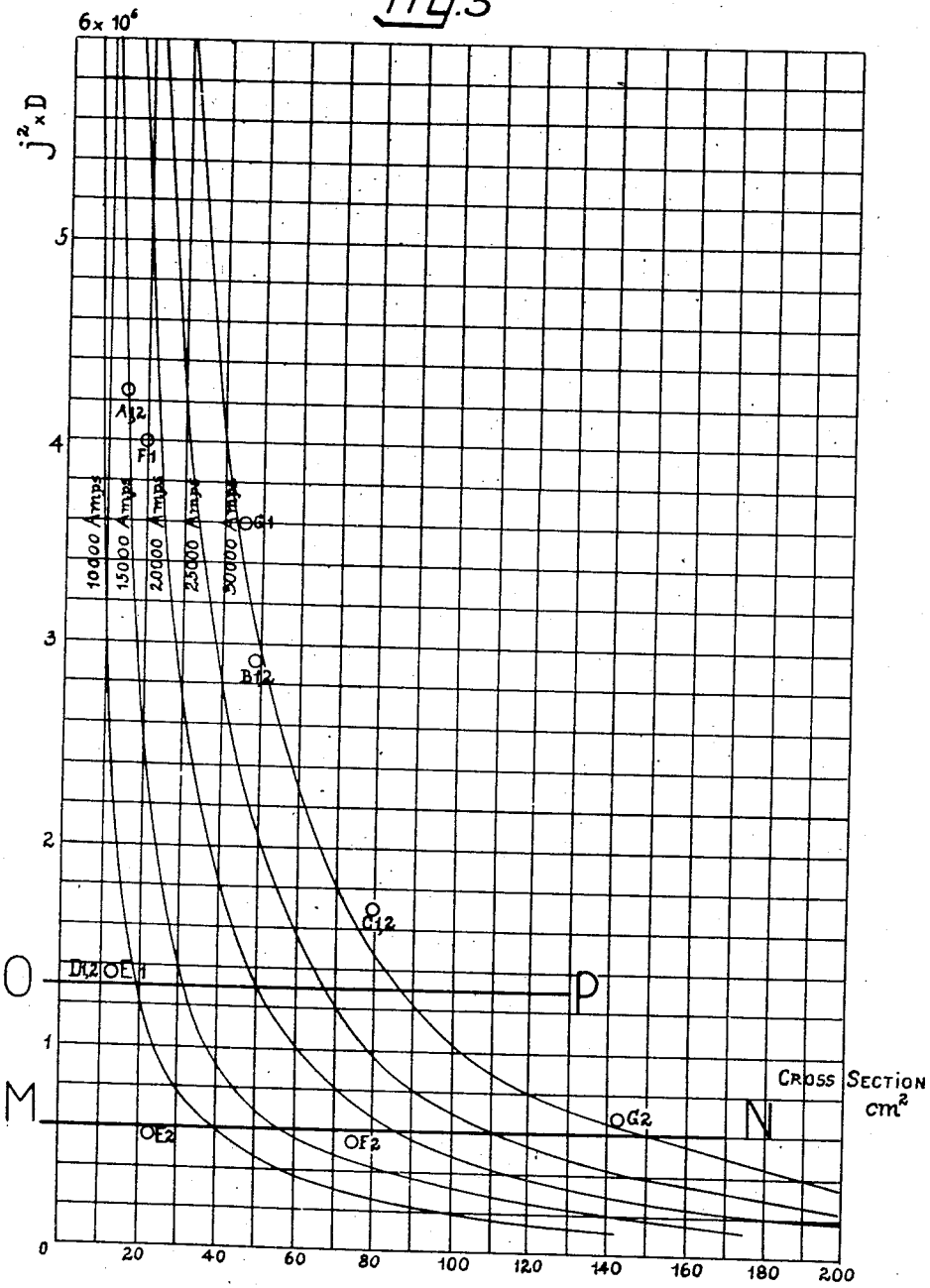

Patented Feb. 18, 1947

2,415,974

UNITED STATES PATENT OFFICE 2,415,974

SUBMERGED RESISTOR TYPE INDUCTION FURNACE AND METHOD OF OPERATING

Manuel Tama and Mario Tama, Morrisville, Pa., assignors to Ajax Engineering Corporation, Trenton, N. J.

Application April 21, 1945, Serial No. 589,478

4 Claims. (Cl. 13—29)

This invention relates to a method of melting metals in induction furnaces of the submerged resistor type; it is a continuation in part of U. S. Patent No. 2,375,049.

While the invention may be applicable to the melting of all metals and metal alloys which have a tendency to segregate oxides and other solid non-metallic components, its widest field of application is in the melting of light metals and light metals containing alloys. This denomination includes alloys containing aluminum and magnesium as the chief ingredients, which have a pronounced tendency to form oxides, nitrides and other solid non-metallic components in the molten state. Furthermore, due to the low specific gravity of these light metals, the above mentioned non-metallic components do not have enough buoyancy which would force them to the surface of the molten metal, as is the case with heavy metals. Therefore, when attempts have been made to melt light metals in induction furnaces of the submerged resistor type, difficulties were encountered due to the clogging of the narrow melting channels by said non-metallic components or slags.

The method disclosed in Patent No. 2,375,049 is based on the recognition that non-metallic components and slags, suspended in the molten metal contained in the secondary slots or tubes of submerged resistor type induction furnaces, may at will be caused to adhere to the walls of said slots or tubes or prevented from doing so by adequate control of the electromagnetic pressure gradients created in the secondary circuit. As shown in U. S. Patent No. 2,375,049, these electromagnetic pressure gradients are proportional to the product $j^2 \times D$, where $j$ stands for current density and D for the diameter of the slot or tube; these forces may reach very high values in furnaces of the instant type. If the cross section of the slot is not circular, D represents the diameter of a circle having the same area as the non-circular slot.

In the specification and claims of the present application all dimensions are given in the international electric units, viz., the electric currents in amperes, the length in centimeters, the surface in square centimeters and the current density in amperes per square centimeter.

In the course of an extensive investigation initiated by an unintentional observation it was found that the deposition of slags from the molten conductor could be so controlled by maintaining certain relations between current, current density and cross-sectional area of the conductor so as to take place and/or to be inhibited at desired predeterminable places within the molten conductor. By confining the deposits of slags from the melting circuit to sections which may be easily accessible to cleaning tools during the operation of the furnace and by removing the slags therefrom while keeping the other sections of the melting circuit free from slag deposits, a practically continuous operation of an induction furnace of the submerged resistor type has been accomplished for the first time in connection with the melting of light metals and light metal containing alloys. The cleaning of the readily accessible sections of the secondary circuit is preferably achieved by means of straight cleaning tools which are inserted in these circuit sections from above and lifted therefrom together with the slag deposits adherent thereto without emptying the furnace and without interrupting the melting operation.

The thus established operating principle of a continuously operating furnace of this type has been thoroughly investigated and further developed, and it is the primary object of this invention to provide more detailed information on the conditions which will permit to operate these furnaces continuously for practically unlimited periods of time.

It is another object of the invention to more specifically define the range of the working conditions which will cause the deposition of slags and other non-metallic components in certain sections of the molten conductor, and which will assuredly inhibit the same in other sections.

It is also an object of the invention to extend the life-time of the refractory lining of the secondary block by restricting the attacking action of the slag deposits to a comparatively small area of the secondary melting circuit, which is well within reach of easy repair.

The furnaces, which were used to establish specific operating rules, forming the subject matter of this invention, are in principle the same type as those shown in Patent 2,375,049. They are provided with a secondary melting circuit composed of a bottom channel having a plurality of channel sections connecting the bottom channel and the melting hearth.

With the above recited objects in view, the invention is illustrated in the accompanying drawings as being applied to a furnace of this type.

In the drawings,

Figs. 2 and 3 are vertical sectional elevations of another furnace of the above stated type, Fig. 2 being a section on line 2—2 of Fig. 3;

Fig. 4 is a chart listing important characteristics of several furnaces of this type from which the data have been compiled upon which the invention is based, and of prior art furnaces provided with melting channels of equal cross sectional area over their entire length.

Fig. 5 is a graph illustrating the relationship between the electromagnetic pressure gradients and the variation of the cross-sectional areas of the secondary conductor.

Figure 1:
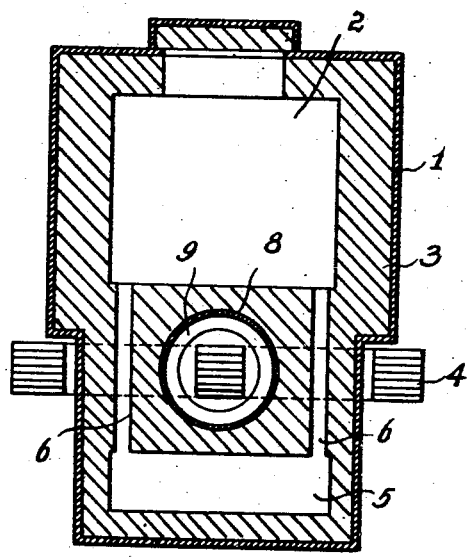
Fig. 1 is a sectional vertical elevation of a submerged resistor type induction furnace adapted to be operated in accordance with the principles on which this invention is based.

The furnace shown in Fig. 1 comprises a hearth 2 and a secondary loop composed of bottom channel 5, and channels 6 connecting the latter with the hearth. The furnace is surrounded by a casing 1 which is provided with a refractory lining 3. The secondary loop is threaded by a transformer assembly composed of iron core 4 and coil 9 and separated from the refractory lining by asbestos sleeve 8. Air cooling is provided in the usual manner to dissipate the heat created in the primary coil 9. The cross sectional area of the bottom chanel 5 is dimensioned in relation to the cross area of the connecting channels 6 according to the teachings of this invention.

Figure 2:
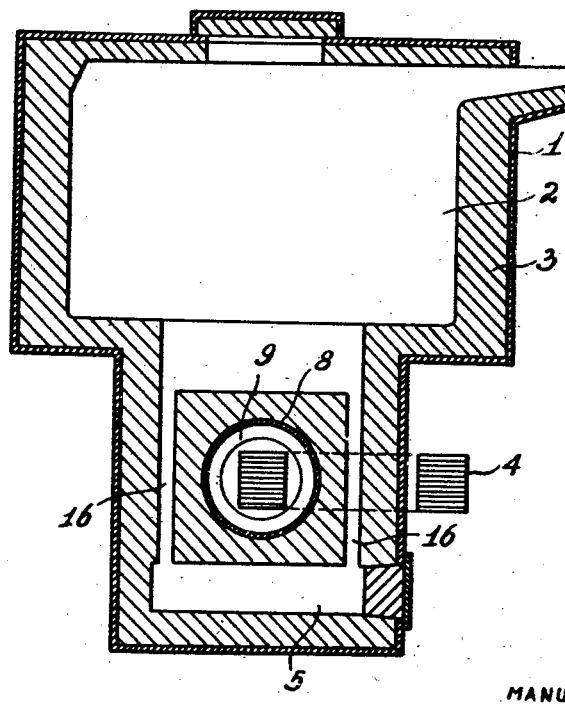

The furnace illustrated in Figs. 2 and 3 is in principle of the same type as the one shown in Fig. 1, but it is provided with two secondary blocks which are inclined at an angle in relation to each other and to the melting hearth.

Also here the furnace which has a hearth 2 is surrounded by a casing 1 provided with a refractory lining 3.

However, as stated above, two secondary blocks are provided and each of these secondary blocks contains two secondary loops composed of bottom channels 5 and chanels 6 connecting the bottom channel with the hearth 2.

The secondary loops are threaded by transformer assemblies composed of iron cores 4 and coils 9 and separated from the refractory lining by asbestos sleeves 8.

The furnaces which demonstrate the principles upon which this invention is based are, as stated above, of the submerged resistor type. The common characteristics of these furnaces consist of a melting hearth and one or more secondary circuits filled with molten metal during the entire melting period and energized by one or more transformer assemblies.

In order to demonstrate this invention operating data for several furnaces of this type illustrating the prior art type and illustrating the invention have been given in a chart shown in Fig. 4. These furnaces have been designated with code letters A to G.

The furnace A was of the type described in U. S. Patent No. 1,201,671; it has, for instance, been used for melting brass. The furnaces B and C were of the type described in British patent specification No. 506,980, granted to one of the applicants on June 7, 1939.

The furnaces E to G were of the type shown in Fig. 1. All of them were single coil furnaces, while the furnace F was a twin coil furnace, which is characterized by a transformer provided with two coils, one on each leg, as shown in U. S. Reissue Patent No. 22,602.

In furnaces A to D, the cross sectional area of the bottom chnanel was substantially equal to that of the connecting channel sections, while in furnaces E to G, the cross-sectional area of the bottom channel was much larger than that of the connecting channels in conformity with the teachings of the invention. In all cases, the secondary current is equal to the primary current multiplied by the number of turns. In the columns for the cross section, the current density and the product $j^2 \times D$ of chart Fig. 4, two figures are entered for furnaces E, F and G, the upper figures referring to the connecting channels and the lower figures to the bottom channel.

It is apparent from the graph Fig. 5 that the values for the cross-sectional areas are entered on the abscissae and those for the product $j^2 \times D$ on the ordinate. Five curves have been entered in this graph for 10,000, 15,000, 20,000, 25,000 and 30,000 amperes. Following any of these curves within the limits of the chart will give two coordinated values for the product $j^2 \times D$ and the corresponding cross sectional area of the conductor. For example, if a secondary slot or tube has a cross-sectional area of 40 cm.$^2$ and the current flowing through said tube is of 30,000 amperes, the chart shows that the product $j^2 \times D$ is equal to $4 \times 10^6$. Different points have been entered into graph Fig. 5 and designated with the same code numbers as in Fig. 3, thus indicating that all these points refer to the working conditions of each particular furnace designated by the letters A to G as explained above. The figures relating to the bottom and to the connecting channels of furnaces E, F and G are denominated by the affix numerals 2 and 1, respectively. Whereas in furnaces A to D the slags were deposited substantially uniformly over the entire length of the secondary circuit and cleaning of the channels was necessary substantially after each new charge, the furnaces E to G were maintained in continuous operation by removing the slags from the connecting channels, while they were full of metal while the bottom channels were kept entirely free from slag deposition.

The graph Fig. 5 shows very instructively how the electromagnetic pressure gradients causing or inhibiting the slag depositions are affected by the change of the cross-sectional area of the secondary loop. All the five curves entered in Fig. 5, when followed from right to left, show a very slow rising tendency up to a certain point; from there on the rise is very sharp. In other words, if the cross sectional area is diminished gradually, the pressure gradients will first grow slowly and after a certain limit this increase will be very rapid.

The meaning of the markings entered into the graph Fig. 5, will now be analyzed more in detail.

$A_{1,2}$ corresponds to the conditions maintained in furnace A, see Fig. 3. The secondary current was 14,200 amperes, the cross section of the secondary 14.1 cm.$^2$, and the value of $j^2 \times D$ was $4.25 \times 10^6$. Operation with this furnace was entirely unsuccessful. The configuration of the melting channels corresponds to that shown in U. S. Patent No. 1,201,671. Deposits were formed quickly and the furnace was out of operation after a short time.

The point $B_{1,2}$ represents the operating conditions of furnace B. The secondary current is 29,200 amperes, the substantially uniform cross section of the secondary was 48 cm.$^2$, and the value of $j^2 \times D$ was $2.9 \times 10^6$. This furnace had to be cleaned at least once a day with a flexible chain, and the metal had to be emptied before cleaning.

$C_{1,2}$ signifies the operating conditions of furnace C. The secondary current was 33,000 amperes, the substantially uniform cross section of the secondary 80 cm.² and the value of $j^2 \times D$ equals $1.7 \times 10^6$. Although in this furnace the economic limit of increasing the cross section was almost reached, which is reflected in a very low power factor, a very complicated cleaning procedure had to be used. The standard procedure consisted of cleaning the channels after every melt after raising the temperature of the metal to around 800° C., of passing three flexible chains of gradually increasing sizes around the channels from either side and of raking out the slags thus released.

$D_{1,2}$ characterizes the operating conditions of furnace D. The secondary current was 7,500 amperes, the melting channel had an equal cross section all the way through of 12.9 cm.², the value of $j^2 \times D$ was $1.36 \times 10^6$. The configuration of the melting channels was of a rectangular type, as shown in Fig. 1, with the exception that the bottom channel was equal in cross section to the connecting channels. This furnace was quickly clogged with slag deposits particularly on both sides of the sharp angle bends between the bottom channel and the channels connecting the same with the hearth.

$E_2$ and $E_1$ represent the working conditions of the bottom channels and connecting channels respectively of furnace E. The secondary current was 7,500 amperes, the connecting channels had a cross section of 12.9 cm. The cross section of the bottom channel was 22 cm.². $E_2$ represents the working conditions of the bottom channel, where slag deposition was fully excluded. It will be seen from the graph that the electromagnetic pressure gradients in this bottom channel correspond to $j^2 \times D = 0.57 \times 10^6$. $E_1$ designates the point in the curve where the slag depositions occurred within the connecting channels requiring cleaning from above without interruption of the furnace operation.

$F_1$, $G_1$ and $F_2$ and $G_2$ illustrate the corresponding working conditions of furnaces F and G. Points $F_2$ and $G_2$ designate the points in the curves where slag deposition was inhibited for a practical and unlimited period, and points $F_1$ and $G_1$ where deposition of slags occurred in the connecting channels. The cleaning of the connecting channels was effected by introducing cleaning tools from above without emptying the charge.

The current density in the bottom channel of the 10 kw. furnace E, see chart Fig. 4, is about 50% higher than that of the 125 kw. unit F; yet the same inhibition of slag deposition is obtained in the bottom channel, because in both cases the pressure gradient $j^2 \times D$ is the same. This interesting phenomenon proves that reliance on current density alone does not solve the problem which dominates this and the invention of U. S. Patent No. 2,375,049, and that a satisfactory solution depends upon maintaining certain pressure gradients resulting from the proper correlation of current, current density and cross sectional area of the molten conductor.

The five curves shown on Fig. 5 indicate how the pressure gradients, change if the cross section of a part of the secondary loop is increased or decreased. All the curves have a sharp bend upward, thus indicating that within certain limits slight changes of the cross section will greatly effect the values of the pressure gradients. A full physical and mathematical explanation and evaluation of the forces tending to separate the slag from the molten conductor has been given in U. S. Patent No. 2,375,049, and therefore will not be repeated here.

Lines O—P and M—N, the first designating the electromagnetic pressure gradients defined by $j^2 \times D = 1.3 \times 10^6$, and the second designating pressure gradients defined by $j^2 \times D = 0.6 \times 10^6$, signify the critical operating range forming the subject matter of this invention.

If a relationship is maintained in furnaces of the instant type between current and cross sectional area of the molten conductor and between current density and cross sectional area of the molten conductor, which results in the creation of electromagnetic pressure gradients cited above line O—P deposition of non-metallic bath components and of slags will occur within a very short period. These are the working conditions which, as proven by the above described observations would require frequent interruption of the furnace operation and emptying of the furnace for the introduction of complicated cleaning appliances to reach the extent of the secondary loop.

Line M—N indicates the lower limitation of the critical working range. It is defined by maintaining a relationship between current density and cross sectional area of the molten conductor which will cause the creation of electromagnetic pressure gradients defined by $j^2 \times D = 0.6 \times 10^6$. If electromagnetic pressure gradients of this magnitude are maintained in a submerged resistor type induction furnace, deposition of slags will be inhibited in the secondary loop for a practically unlimited period of time, at the same time preserving an optimum of operating economy.

By confining the operating conditions defined by $j^2 \times D$ equals $1.3 \times 10^6$, which is indicated in line O—P through the portions of the secondary circuit, which connect the bottom channel and the hearth and which can be easily kept clean from slag deposits without emptying the furnace, and on the other hand maintaining operating conditions defined by $j^2 \times D = 0.6 \times 10^6$ in the inaccessible bottom channel, a substantially continuous furnace operation is assured.

This is an important achievement in this art, in view of the fact that the frequent interruptions of the furnace operation for the removal of slags from the melting circuit and the difficulties caused thereby represent the one great drawback which has heretofore prevented the general large scale use of submerged resistor type induction furnaces for melting light alloys, in particular alloys containing aluminum as the chief ingredient.

We claim:

1. In a method for melting metals in submerged resistor type induction furnaces having a hearth and a secondary melting circuit composed of a bottom channel and channel portions connecting said bottom channel with said hearth, maintaining in the said connecting channels a relationship between current and channel cross area and between current density and channel cross area to produce electromagnetic pressure gradients of a magnitude defined by $j^2 \times D \geq 1.3 \times 10^6$ and maintaining in the said bottom channel a relationship between current and channel cross area and between current density and channel cross area to produce electromagnetic pressure gradients of a magnitude defined by $j^2 \times D < 1.3 \times 10^6$.

2. In a method according to claim 1, maintaining in the bottom channel electromagnetic pressure gradients of a magnitude defined by $j^2 \times D = 0.5$ to $0.7 \times 10^6$.

3. A submerged resistor type induction furnace comprising a hearth, at least one secondary melting circuit composed of a bottom channel and channel portions connecting said bottom channel with said hearth, the cross area of said bottom channel being dimensioned in relationship to the current and to the current density to produce electromagnetic pressure gradients of a magnitude defined by $j^2 \times D \geqq 1.3 \times 10^6$ and the cross area of said connecting channels being dimensioned in relationship to the current and to the current density to produce electromagnetic pressure gradients of a magnitude defined by $j^2 \times D < 1.3 \times 10^6$.

4. In a furnace according to claim 3 the cross area of the bottom channel being dimensioned in relation to the current and to the current density to produce electromagnetic pressure gradients of a magnitude defined by $j^2 \times D = 0.5$ to $0.7 \times 10^6$.

MANUEL TAMA.
MARIO TAMA.

REFERENCES CITED

The following references are of record in the file of this patent:

UNITED STATES PATENTS

| Number | Name | Date |
| --- | --- | --- |
| 2,375,049 | Tama et al. | May 1, 1945 |